United States Patent Office

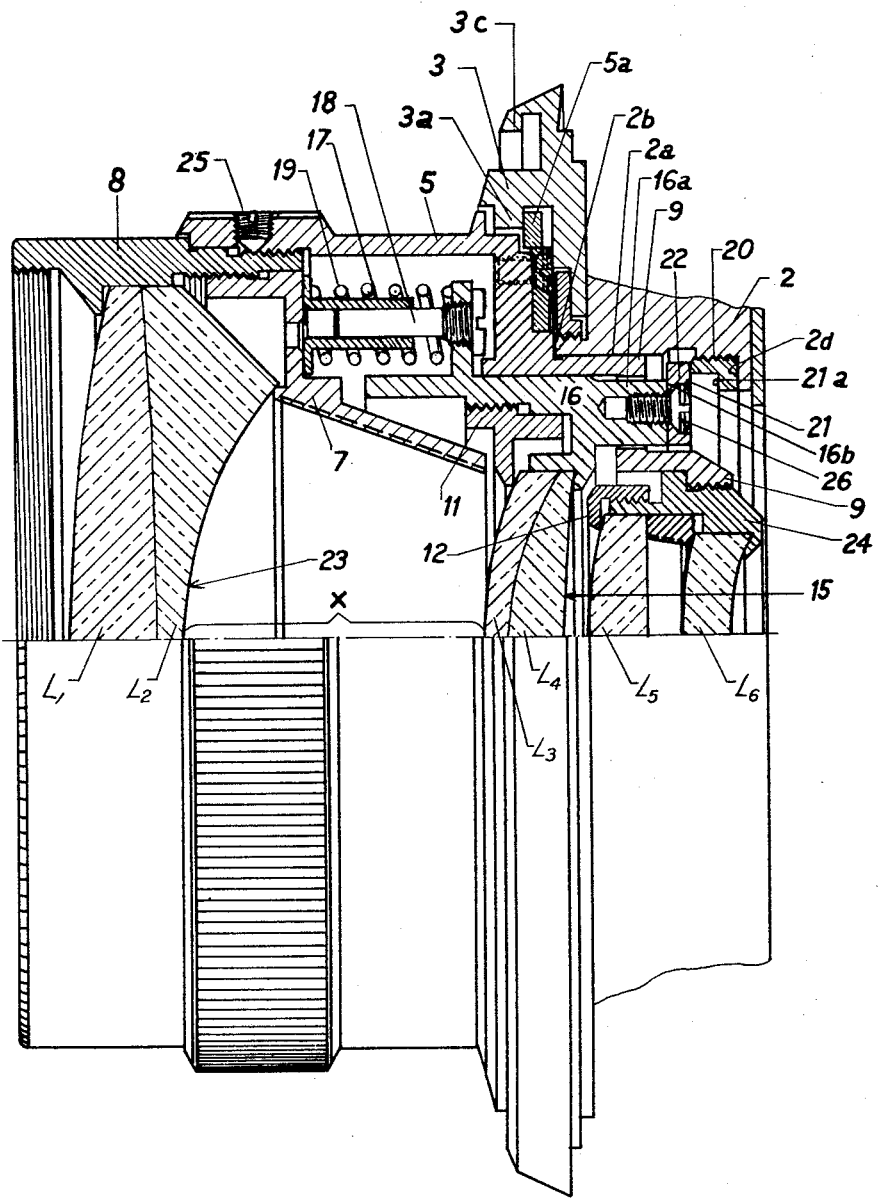

2,811,080
Patented Oct. 29, 1957

2,811,080

ADJUSTABLE AND INTERCHANGEABLE MOUNTING MEANS FOR PHOTOGRAPHIC OBJECTIVE SYSTEMS

Paul Härter, Stuttgart-Wangen, Carl Ort, Stuttgart-Bad-Cannstatt, and Karlheinz Raab and Walter Umbs, Kreuznach, Rhineland, Germany, assignors to Jos. Schneider & Co., Kreuznach, Rhineland, Germany Application May 21, 1954, Serial No. 431,506

Claims priority, application Germany June 5, 1953

11 Claims. (Cl. 88—57)

Our present invention relates to photographic objectives having interchangeable parts for the purpose of changing the angle of view.

In co-pending application Ser. No. 402,679, filed January 7, 1954 by Günter Klemt and assigned to the assignee of our present application, there has been disclosed a photographic objective system adapted to enable the convenient adjustment of exchange (e. g. wide angle or telephoto) objectives, in a manner compensating for manufacturing tolerances, with the aid of markings provided by the manufacturer on the basis of tests made with prototypes of the interchangeable objective parts. Thus, in accordance with the process disclosed in said co-pending application, an interchangeable front portion of a factory-adjusted standard objective may be replaced by the prototype of a corresponding front portion of a wide-angle or telephoto objective, whereupon there may be marked on the fixed rear objective portion the relative position of the exchange prototype in which correct focusing was obtained. Thus the purchaser of a camera originally equipped only with a principal or standard objective may thereafter easily fit a wide-angle or telephoto objective to the camera.

In said co-pending application there has been specifically disclosed a threaded connection between a control ring and a lens-supporting member of a detachable portion of an exchange objective for the purpose of adjusting such objective to correct focusing position in accordance with the prototype determination made at the factory. More particularly, an element coupled with the control ring abuts a preset stop on the fixed objective portion, whereby the desired adjustment is automatically obtained.

The general object of our present invention is to provide a different and somewhat simpler arrangement for automatically bringing about the adjustment of a detachable front portion of an exchange objective by means of a factory-preset stop on the fixed rear portion of such objective.

In accordance with this invention there is provided, at the fixed objective portion common to the principal objective and to one or more exchange objectives, a contact surface effective as a stop for the axial movement of a first lens-carrying member, this member being held relatively displaceably in a detachable front portion of an exchange objective so as to define a variable air space together with a second lens-carrying member of this front portion. The axial position of the second member is invariably fixed by the coupling elements (which may be of the usual bayonet type) serving to secure the two objective portions together. The detachable objective portion is also preferably provided with spring means or the like for axially urging the first lens-carrying member against its stop.

Either or both of the co-operating contact surfaces on the fixed objective portion and on the first lens-carrying member of the detachable portion may be formed by a preferably demountable spacer, such as a ring, whose axial dimension or width determines the advance of this lens carrier and, thereby, the extent of the aforementioned air space in the direction of the optical axis of the objective. Another aspect of our invention, therefore, resides in inserting one or more spacers between a rear face of the movable lens carrier of a prototype of an exchange front portion and a front face of the common rear portion, selecting the thickness of such spacer or spacers in a manner insuring correct focusing of the prototype exchange objective composed of these portions, and subsequently inserting the same spacer or spacers between the said front face of the rear portion and a corresponding rear face of said exchange front portion.

The invention will be further described with reference to the accompanying drawing, the sole figure of which shows, partly in elevation and partly in longitudinal section, an exchange objective according to the invention.

In the drawing there is shown at 2 the housing of a central-aperture-type shutter 2 of conventional design, not further illustrated, having a cylindrical inner wall 2a and a contact surface 2b. The frontal shutter plate 3 is provided with bayonet segments 3a, 3c for connecting the shutter assembly to other camera parts (not shown) and to the detachable front portion of the objective, the latter comprising a bayonet ring 5 provided with segments 5a which matingly engage the segments 3a.

A lens mount 8, threadedly secured to ring 5 and axially fixed therein by means of a set screw 25, serves as a carrier for a first compound lens member 23 composed of the lenses $L_1$, $L_2$. At 9 there is shown a cylindrical extension of ring 5 within which another lens carrier 16 is slidably mounted. This carrier holds a second compound lens member 15, consisting of lenses $L_3$, $L_4$, which represents an intermediate member of the detachable objective portion; this objective portion further comprises two additional lenses $L_5$ and $L_6$, secured to cylinder 9 by means of flanged rings 12 and 24. A similar ring 11 serves to hold lens member 15 in position on carrier 16; this carrier is provided with bosses 16a (only one shown) which pass through corresponding apertures in cylinder 9 and support a spacing ring 22, secured to them by screws 26.

A plurality of guide sleeves 17, preferably three (only one shown), are mounted on a retaining ring 7 which serves to secure the lens member 23 in place. These sleeves slidably receive respective studs 18 projecting from lens carrier 16, the sleeves and the bolts being surrounded by coil springs 19 urging carrier 16 away from carrier 8, thereby tending to increase the variable air space x between the lens members 23, 15 of the detachable front portion of the objective. It may be noted, at this time, that this front portion is equally respresentative of an exchange objective and of a prototype of such objective adapted to co-operate with the rear objective portion comprising lenses $L_5$ and $L_6$.

The ring 22 on movable lens carrier 16 abuts a face 21 of another ring 20 threadedly secured to the shutter housing 2; the two rings thus constitute a pair of spacers serially inserted between a rear face 16b of movable lens carrier 16 and a front face 2d of the stationary objective portion comprising the shutter 2 and, if desired, an additional lens or lenses (not shown) fixed with respect to the shutter as illustrated in the co-pending application referred to.

The ring 20 is shown provided with a second face 21a, set back from face 21, adapted to co-operate with a ring similar to ring 22 but reduced in diameter to engage this face 21a. Thus, ring 22 may be mounted on one type of exchange objective (e. g. a wide-angle objective) whereas the other spacing ring referred to, of smaller diameter but greater width, may be mounted on another type of such objective (e. g. a telephoto objective).

It will be understood from the foregoing that the combined thickness of rings 20 and 22 (or the combined thickness of the reduced shoulder of ring 20 and of the substitute spacing ring co-operating with face 21a thereof) determines the extent of the air space *x* and, thereby, the proper focusing of the exchange objective illustrated. This combined thickness may be readily adjusted to the correct value by suitable machining at the factory, on the basis of focusing tests made with a prototype objective. If the machining is done only on the ring 20, identical rings 22 will be supplied with each exchange objective; if the ring 22 is subjected to machining, this ring (as well as a companion ring for engagement with contact surface 21a) ought to be included in the equipment supplied to the purchaser with the principal objective, for subsequent attachment to an after-acquired exchange objective by means of screws 26.

The invention is, of course, not limited to the specific embodiment described and illustrated, being on the contrary capable of numerous modifications and adaptations without departing from the spirit and scope of the appended claims.

In the construction of these claims it should, furthermore, be remembered that the objective shown in the drawing may, obviously, be bodily displaceable within the camera for focusing in the usual manner and that, therefore, expressions such as "fixed objective portion" are to be construed with this qualification in mind.

We claim:

1. A photographic objective comprising a rear portion, a front portion detachable from said rear portion, means including a movable lens carrier in said front portion for varying the focal length of said objective, said front portion including a fixed support for said lens carrier, means in said front portion axially urging said movable lens carrier relatively to said support toward said rear portion, and fixed stop means on said rear portion engageable by said movable lens carrier for arresting the latter in a predetermined axial position relative to said rear portion.

2. A photographic objective according to claim 1, wherein said movable lens carrier is provided with a detachable ring engaging said stop means.

3. A photographic objective according to claim 2, wherein said stop means comprises a stepped ring having a plurality of concentric faces, said detachable ring being positioned for engagement with one of said faces.

4. In an optical system, in combination, a rear objective portion and a plurality of front objective portions interchangeably attachable to said rear portion, a movable lens carrier in at least one of said front portions, a fixed support for said lens carrier in the last-mentioned front portion, means in the last-mentioned front portion urging said movable lens carrier rearwardly relatively to said support in the direction of the optical axis of the system, and fixed stop means on said rear portion for arresting said movable lens carrier in a predetermined axial position relative to said rear portion.

5. The combination according to claim 4, wherein said rear objective portion includes shutter means.

6. In an optical system, in combination, a rear objective portion, a principal front objective portion and a plurality of auxiliary front objective portions, all of said front portions being provided with coupling means for interchangeably attaching them to said rear portion, a movable lens carrier in each of said auxiliary front portions, each of said auxiliary front portions including a fixed support for said lens carrier, means in each of said auxiliary front portions urging said movable lens carrier rearwardly relatively to said support in the direction of the optical axis of the system, the movable lens carriers of all of said auxiliary front portions being provided with rearward projections of different configurations, and stop means in said rear portion engageable with each of said rearward projections for arresting the respective lens carrier in a predetermined focusing position individual to each of said auxiliary front portions.

7. The combination according to claim 6, wherein said rearward projections comprise respective rings of different diameters, said stop means comprising an annular spacer provided with a plurality of concentric faces each engageable by a respective one of said rings.

8. A photographic objective comprising a rear portion, a front portion detachable from said rear portion, a first lens carrier fixedly held in said front portion, a second lens carrier movably held in said front portion, said two lens carriers defining a variable air space, resilient means in said front portion axially urging said second lens carrier toward said rear portion relatively to said first lens carrier, and fixed stop means on said rear portion engageable by said second lens carrier for arresting the latter in an axial position corresponding to a predetermined size of said air space.

9. A photographic objective according to claim 8, wherein said second lens carrier is provided with a detachable rearward extension positioned for engagement with said stop means.

10. A photographic objective according to claim 8, wherein said resilient means comprises expanding spring means inserted between said first and second lens carriers.

11. A photographic objective according to claim 8, wherein said rear portion comprises a central-aperture-type shutter.

References Cited in the file of this patent

UNITED STATES PATENTS

| Number | Name | Date |
|---|---|---|
| 1,934,561 | Rayton | Nov. 7, 1933 |
| 2,184,018 | Ort | Dec. 19, 1939 |
| 2,263,024 | Wood | Nov. 18, 1941 |
| 2,317,790 | Mellor | Apr. 27, 1943 |
| 2,324,057 | Bennett | July 13, 1943 |
| 2,582,085 | Tolle | Jan. 8, 1952 |
| 2,612,077 | Albrecht | Sept. 30, 1952 |

FOREIGN PATENTS

| 722,817 | France | Jan. 5, 1932 |